US009652842B2

(12) United States Patent
Yin et al.

(10) Patent No.: US 9,652,842 B2
(45) Date of Patent: May 16, 2017

(54) METHOD, APPARATUS AND EQUIPMENT OF INSPECTING QUALITY OF LCD (71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yanyan Yin, Beijing (CN); Jing Xue, Beijing (CN); Hongyan Xing, Beijing (CN); Ziwei Cui, Beijing (CN); Falong Han, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 103 days.

(21) Appl. No.: 14/354,792

(22) PCT Filed: Dec. 10, 2013

(86) PCT No.: PCT/CN2013/089011
§ 371 (c)(1),
(2) Date: Apr. 28, 2014

(87) PCT Pub. No.: WO2015/014067
PCT Pub. Date: Feb. 5, 2015

(65) Prior Publication Data
US 2015/0036913 A1    Feb. 5, 2015

(30) Foreign Application Priority Data
Jul. 30, 2013    (CN) .......................... 2013 1 0326270

(51) Int. Cl.
G02F 1/13    (2006.01)
G06T 7/00    (2017.01)

(52) U.S. Cl.
CPC ............ *G06T 7/001* (2013.01); *G02F 1/1309* (2013.01); *G06T 2207/30121* (2013.01)

(58) Field of Classification Search
CPC ........... G06T 7/001; G06T 2207/30121; G02F 1/1309
See application file for complete search history.

(56) References Cited

U.S. PATENT DOCUMENTS

2011/0235868 A1    9/2011    Kuo et al.
2014/0226004 A1    8/2014    Son et al.

FOREIGN PATENT DOCUMENTS

CN    101738401 A    6/2010
CN    102200519 A    9/2011
(Continued)

OTHER PUBLICATIONS

International Search Report mailed Oct. 6, 2014; PCT/CN2013/089011.
(Continued)

*Primary Examiner* — Siamak Harandi
(74) *Attorney, Agent, or Firm* — Ladas & Parry LLP (57) ABSTRACT A method, an apparatus and an equipment of inspecting the quality of an LCD are provided, the method includes: obtaining optical parameters of the LCD; capturing images of the LCD; and determining that the LCD is defective after determining that the optical parameters are not in the range of the preset optical parameters and/or the captured images of the LCD are not consistent with the pre-stored images. Through the technical solution of the present invention, it can effectively differentiate the defect types of a product and record the defect position of the product, thereby it can (Continued)

effectively reduce misjudgment or miss test caused by the visual differences between operators to improve the quality and yield of manufactured LCD.

13 Claims, 5 Drawing Sheets

(56) References Cited

FOREIGN PATENT DOCUMENTS

| CN | 202133842 U | 2/2012 |
|---|---|---|
| CN | 102591044 A | 7/2012 |
| JP | 2008-224256 A | 9/2008 |
| TW | 201315995 A | 4/2013 |

OTHER PUBLICATIONS

International Preliminary Report on Patentability Appln. No. PCT/CN2013/089011; Dated Feb. 2, 2016.
First Chinese Office Action dated Aug. 24, 2016; Appln. No. 201310326270.7.

METHOD, APPARATUS AND EQUIPMENT OF INSPECTING QUALITY OF LCD

TECHNICAL FIELD

Embodiments of the present invention relate to a method, an apparatus and an equipment of inspecting the quality of a liquid crystal display (LCD).

BACKGROUND

In the conventional LCD technology, the steps of detecting defect LCD products and determining the level of LCD final products are all performed by manual work. However, it will misjudge and miss test some LCD products, which will influence the quality and yield of the manufactured LCD products due to the visual differences between operators or human factors or the like.

SUMMARY

In view of that, embodiments of the present invention provide a method, an apparatus and an equipment of inspecting the quality of a liquid crystal display (LCD).

According to an aspect of the present invention, a method of inspecting the quality of an LCD is provided, which comprises: obtaining optical parameters of the LCD; capturing images of the LCD; and if determining that the optical parameters are not in the range of the preset optical parameters and/or the captured images of the LCD are not consistent with the pre-stored images, deciding that the LCD is defective.

According to an embodiment of the present invention, the step of deciding that the LCD is defective comprises: after determining that the optical parameters are not in the range of the preset optical parameters and/or the captured images of the LCD are not consistent with the pre-stored images, determining whether the defects are in a same plane; if the defects are in the same plane, deciding that the LCD has an inside-cell defect.

According to an embodiment of the present invention, the method further comprises: if the defects are not in the same plane, determining whether the LCD is broken; if the LCD is broken, deciding that the LCD has a broken defect.

According to an embodiment of the present invention, the method further comprises: if the LCD is not broken, deciding a type of the defect based on images of bad quality.

The step of deciding a type of the defect based on the images of bad quality comprises: if the defect is detected by an image of L0 grey scale, deciding that the defect is a polarizer (POL) defect or a line defect; and if the defect is detected by an image of L255 grey scale, deciding that the defect is a back light unit (BLU) defect.

According to an embodiment of the present invention, the method further comprises: if the defect is detected neither by the image of L0 grey scale nor by the image of L255 grey scale, comparing the image of bad quality with pre-stored images of bad quality; if the image of bad quality is consistent with the pre-stored images of bad quality, deciding a name of the defect.

According to an embodiment of the present invention, the method further comprises: recording position coordinates of the defect after deciding the type of the defect.

According to an embodiment of the present invention, the method further comprises: if the LCD does not have any defect, deciding that the LCD is an optimal level and discharging the LCD through a first channel; if the LCD has an inside-cell defect, deciding that the LCD is a minimum level and discharging the LCD through a first channel to perform a next process; if the LCD has a broken defect, discharging the LCD through a second channel to scrap the LCD; and if the LCD has a POL defect, a line defect or a BLU defect, discharging the LCD through a third channel to rework the LCD.

According to another aspect of the present invention, an apparatus of inspecting the quality of a liquid crystal display (LCD) is provided, which comprises: a detecting unit, an image capture unit and an analysis processing unit; wherein the detecting unit is configured to detect the LCD to obtain optical parameters of the LCD and send the optical parameters to the analysis processing unit; the image capture unit is configured to capture images of the LCD and send the captured images to the analysis processing unit; and the analysis processing unit is configured to decide that the LCD is defective if determining that the optical parameters are not in the range of the preset optical parameters and/or the captured images are not consistent with the pre-stored images.

According to an embodiment of the present invention, the analysis processing unit comprises a determining unit and a type deciding unit; wherein the determining unit is configured to determine whether the optical parameters are in the range of the preset optical parameters and whether the captured images of the LCD are consistent with the pre-stored images; and the type deciding unit is configured to decide a type of the defect based on the determining result of the determining unit.

According to an embodiment of the present invention, the determining unit is configured to determine whether the defects are in a same plane after determining that the optical parameters are not in the range of the preset optical parameters and/or the captured images of the LCD are not consistent with the pre-stored images; and the type deciding unit is configured to decide that the LCD has an inside-cell defect if the defects are in the same plane.

According to an embodiment of the present invention, the determining unit is also configured to decide whether the LCD is broken after determining that the defects are not in a same plane; and the type deciding unit is configured to decide that the LCD has a broken defect if the determining unit determines that LCD is broken.

According to an embodiment of the present invention, the determining unit is configured to decide a type of the defect based on images of bad quality if the LCD is not broken; and the type deciding unit is further configured to decide that the defect is a polarizer (POL) defect or a line defect if the determining unit determines that the defect is detected by an image of L0 grey scale; and to decide that the defect is a back light unit (BLU) defect if the determining unit determines that the defect is detected by an image of L255 grey scale.

According to an embodiment of the present invention, the determining unit is configured to compare the images of bad quality with pre-stored images of bad quality if the determining unit determines that the defect is detected neither by the image of L0 grey scale nor by the image of L255 grey scale; and the type deciding unit is configured to decide a name of the defect if the determining unit determines that the images of bad quality are consistent with the pre-stored images of bad quality.

According to an embodiment of the present invention, the analysis processing unit further comprises a coordinate obtaining unit configured to record position coordinates of the defect after deciding the type of the defect.

According to an embodiment of the present invention, the analysis processing unit further comprises a distributing unit configured to distribute the LCDs to different channels to discharge the LCDs based on the quality and defect types of the LCDs, comprising: if the LCD does not have any defect, deciding that the LCD is an optimal level and distributing the LCD to a first channel to discharge the LCD; if the LCD has an inside-cell defect, deciding that the LCD is a minimum level and distributing the LCD to the first channel to discharge the LCD; if the LCD has a broken defect, distributing the LCD to a second channel to discharge and scrap the LCD; and if the LCD has a POL defect, a line defect or a BLU defect, distributing the LCD to a third channel to discharge and rework the LCD.

According to another aspect of the present invention, an equipment of inspecting the quality of a liquid crystal display (LCD) is provided, which comprises a detecting platform, a lens support platform, a slide rail connecting the detecting platform with the lens support platform, and a host machine; wherein the detecting platform is configured to place the LCD to be detected; the lens support platform has a plurality of collecting points configured to perform optical collection for the LCD supported on the detecting platform, wherein each of collecting points is configured with an optical lens and an optical camera; and the host machine is electrically connected with the optical lens and the optical camera provided on the lens support platform, and the host machine is configured to obtain optical parameters of the LCD and capture images of the LCD and decide that the LCD is defective after determining that the optical parameters are not in the range of the preset optical parameters and/or the captured images of the LCD are not consistent with the pre-stored images.

According to an embodiment of the present invention, the lens support platform is configured with nine collecting points, and the nine collecting points are respective top points of four corners, middle points of four sides and a central point of the lens support platform.

According to an embodiment of the present invention, the detecting platform is configured with an accommodating part for accommodating the LCD and a light source below the accommodating part, wherein the light source is configured to illuminate the LCD accommodated in the accommodating part.

According to an embodiment of the present invention, the collecting points provided on the lens support platform are arranged in a zigzag manner beginning from the top right corner in sequence: a first collecting point, a second collecting point, a third collecting point, a fourth collecting point, a fifth collecting point, a sixth collecting point, a seventh collecting point, an eighth collecting point and a ninth collecting point; wherein a first optical lens at the first collecting point is configured to scan LCD from 180 degrees to 270 degrees in counterclockwise in the horizontal direction and scan LCD at each angle range in vertical direction by using the first collecting point as a coordinate origin, so as to obtain optical parameters of the LCD; a second optical lens at the second collecting point is configured to scan LCD from 180 degrees to 0 degree in counterclockwise in the horizontal direction and scan LCD at each angle range in vertical direction by using the second collecting point as a coordinate origin, so as to obtain optical parameters of the LCD; a third optical lens at the third collecting point is configured to scan LCD from 270 degrees to 0 degree in counterclockwise in the horizontal direction and scan LCD at each angle range in vertical direction by using the third collecting point as a coordinate origin, so as to obtain optical parameters of the LCD; a fourth optical lens at the fourth collecting point is configured to scan LCD from 270 degrees to 90 degree in counterclockwise in the horizontal direction and scan LCD at each angle range in vertical direction by using the fourth collecting point as a coordinate origin, so as to obtain optical parameters of the LCD; a fifth optical lens at the fifth collecting point is configured to scan LCD from 0 degree to 360 degrees in counterclockwise in the horizontal direction and scan LCD at each angle range in vertical direction by using the fifth collecting point as a coordinate origin, so as to obtain optical parameters of the LCD; a sixth optical lens at the sixth collecting point is configured to scan LCD from 90 degrees to 270 degrees in counterclockwise in the horizontal direction and scan LCD at each angle range in vertical direction by using the sixth collecting point as a coordinate origin, so as to obtain optical parameters of the LCD; a seventh optical lens at the seventh collecting point is configured to scan LCD from 90 degrees to 180 degrees in counterclockwise in the horizontal direction and scan LCD at each angle range in vertical direction by using the seventh collecting point as a coordinate origin, so as to obtain optical parameters of the LCD; an eighth optical lens at the eighth collecting point is configured to scan LCD from 0 degree to 180 degrees in counterclockwise in the horizontal direction and scan LCD at each angle range in vertical direction by using the eighth collecting point as a coordinate origin, so as to obtain optical parameters of the LCD; a ninth optical lens at the ninth collecting point is configured to scan LCD from 0 degree to 90 degrees in counterclockwise in the horizontal direction and scan LCD at each angle range in vertical direction by using the ninth collecting point as a coordinate origin, so as to obtain optical parameters of the LCD; and nine cameras corresponding to the nine collecting points are configured to capture images of corresponding regions of the LCD.

According to an embodiment of the present invention, the nine optical lenses and the nine cameras are connected to the lens support platform by slide rails.

BRIEF DESCRIPTION OF THE DRAWINGS

Embodiments of the present invention will be described in more detail below with reference to the accompanying drawings to allow one of ordinary skill in the art to understand the present invention more clearly, and wherein.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments and variants can be obtained by those of ordinary skill in the art without creative labor and those embodiments and variants shall fall into the protection scope of the present invention.

Unless otherwise defined, all the technical and scientific terms used herein have the same meanings as commonly understood by one of ordinary skill in the art to which the present invention belongs. The terms, such as "first," "second" or the like, which are used in the description and the claims of the present application, are not intended to indicate any sequence, amount or importance, but for distinguishing various components. Also, the terms, such as "a/an," "one," "the/said" or the like, are not intended to limit the amount, but for indicating the existence of at lease one. The terms, such as "comprise/comprising," "include/including" or the like, are intended to specify that the elements or the objects stated before these terms encompass the elements or the objects and equivalents thereof listed after these terms, but not preclude other elements or objects. The terms, such as "On," "under," or the like, are only used to indicate relative position relationship, and when the position of the object which is described is changed, the relative position relationship may be changed accordingly. The terms, such as "connect/connecting/connected," or the like, are not intended to define a physical connection or mechanical connection, but may include an electrical connection/coupling, directly or indirectly.

Figure 1:
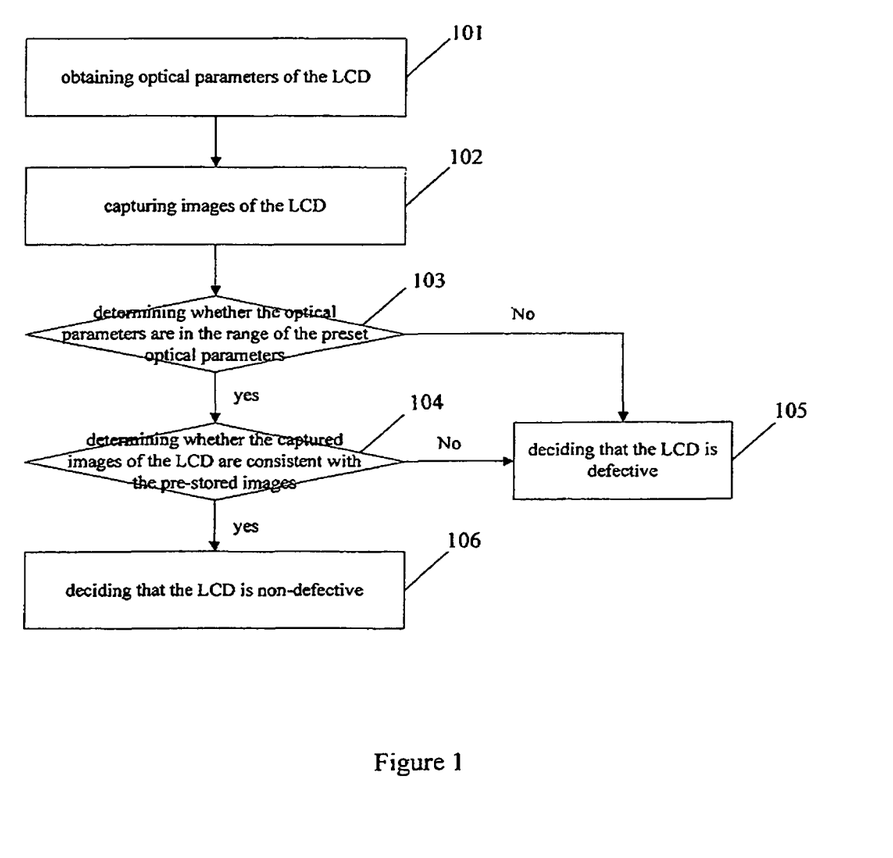
FIG. 1 shows a flowchart of a method of inspecting the quality of a LCD provided in a first embodiment of the present invention.
Figure 6:
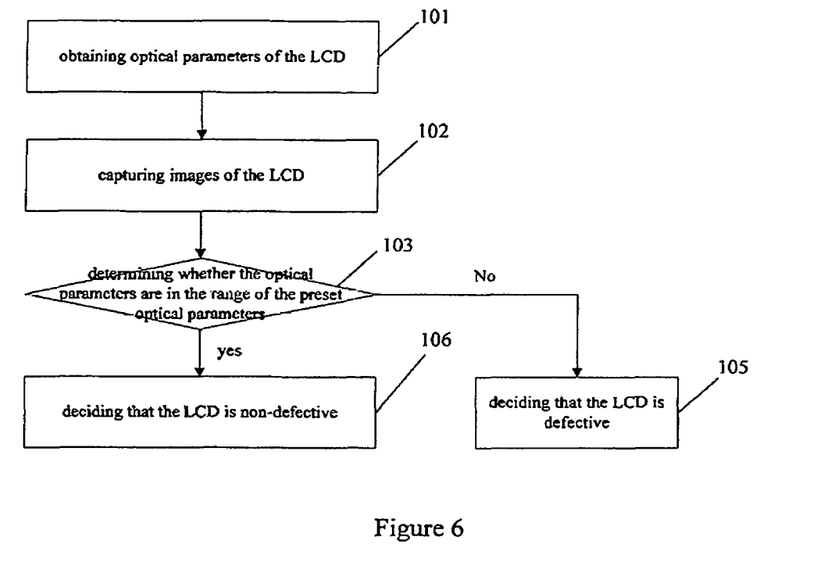
FIGS. 6-7 show flowcharts of methods of inspecting the quality of a LCD provided in other embodiments of the present invention, respectively.
Figure 7:
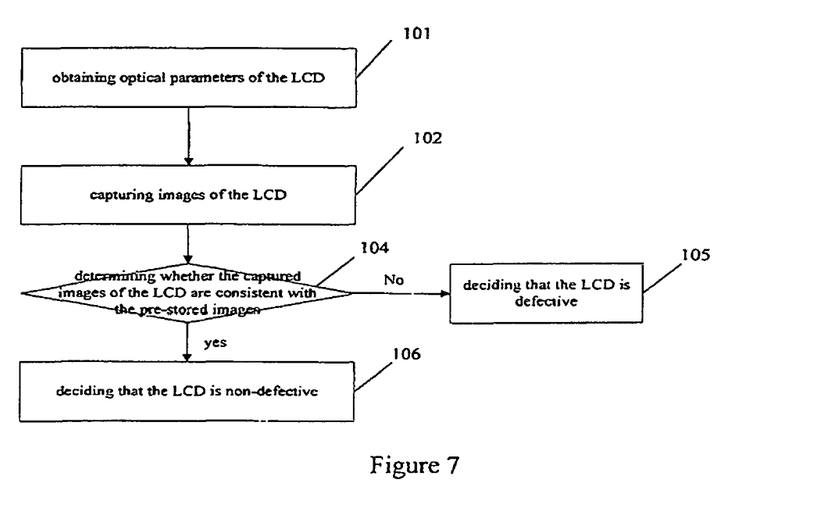

FIG. 1 and FIGS. 6-7 show flowcharts of methods of inspecting the quality of a liquid crystal display (LCD) provided in embodiments of the present invention, respectively, the methods comprise the following steps.

Step 101: detecting the LCD and obtaining optical parameters of the LCD.

Herein, the step of obtaining the optical parameters of the LCD comprises obtaining a luminance value, a chrominance value and a color temperature value of the LCD.

For example, the optical parameters of the LCD, such as a luminance value, a chrominance value and a color temperature value or the like, are obtained by using a fixed light source to illuminate the LCD to be detected and using optical lenses in different azimuths to scan a surface of the LCD.

Step 2: capturing images of the LCD.

Herein, the images of the LCD are captured by cameras in different azimuths.

Steps 103-106: determining whether the optical parameters are in the range of the preset optical parameters; if yes, further determining whether the captured images of the LCD are consistent with the pre-stored images; when the optical parameters are not in the range of the preset optical parameters and/or the captured images of the LCD are not consistent with the pre-stored images, deciding that the LCD is defective; otherwise, deciding that the LCD is non-defective.

Herein, the preset optical parameters of the LCD are, for example, a chrominance of red color is generally about x:0.632, y:0.346, wherein the permitted fluctuation is about 0.02, so if the chrominance of red color is between x:0.0612-0.652, y:0.326-0.366, the chrominance of red color is deemed as good.

According to an embodiment of the present invention, the step of deciding that the LCD is defective comprises: after determining that the optical parameters are not in the range of the preset optical parameters and/or the captured images of the LCD are not consistent with the pre-stored images, further determining whether the defects are in a same plane; if the defects are in the same plane, deciding that the LCD has an inside-cell defect.

According to an embodiment of the present invention, if the defects are not in a same plane, further determining whether the LCD is broken; if the LCD is broken, deciding that the LCD has a broken defect.

According to an embodiment of the present invention, if the LCD is not broken, deciding a type of the defect based on images of bad quality, which comprises: if the defect is detected by an image of L0 grey scale, deciding that the defect is a polarizer (POL) defect or a line defect; and if the defect is detected by an image of L255 grey scale, deciding that the defect is a back light unit (BLU) defect.

Herein, the image of L0 grey scale is a whole black image, wherein the whole black image is used to determine whether the defect is the POL defect or the line defect; the image of L255 grey scale is a whole white image, wherein the whole white image is used to determine whether the defect is the BLU defect.

According to an embodiment of the present invention, if the defect is detected neither by the image of L0 grey scale nor by the image of L255 grey scale, comparing the image of bad quality with pre-stored images of bad quality; if the image of bad quality is consistent with the pre-stored images of bad quality through the comparing, deciding a name of the defect.

Herein, if the defect is detected neither by the image of L0 grey scale nor by the image of L255 grey scale, comparing the image of bad quality with the pre-stored images of bad quality; if the image of bad quality is consistent with the pre-stored images of bad quality through the comparing, recording the type of the image of bad quality.

According to an embodiment of the present invention, the method further comprises issuing an alert by red light flashing or voice when the image of bad quality is not consistent with the pre-stored images of bad quality.

Herein, if the image of bad quality is not consistent with the pre-stored images of bad quality, warning a technician by an alert; and the technician decides a type of the defect manually.

According to an embodiment of the present invention, recording position coordinates of the defect after deciding the type of the defect.

According to an embodiment of the present invention, if the LCD does not have any defect, deciding that the LCD is an optimal level and discharging the LCD through a first channel.

If the LCD has a cell defect, deciding that the LCD is a minimum level and discharging the LCD through a first channel to perform a next process.

If the LCD has a broken defect, discharging the LCD through a second channel to scrap the LCD.

If the LCD has a POL defect, a line defect or a BLU defect, discharging the LCD through a third channel to rework the LCD.

Herein, after deciding the defect type of the LCD, a next process is performed to the LCD based on the defect type. For example, based on all the images, if the LCD does not have any defect, deciding that the LCD is an optimal level and discharging the LCD through a first channel to perform a next process; if the LCD has an inside-cell defect, it indicates that the LCD cannot be repaired but can still be used, then deciding that the LCD is a minimum level and discharging the LCD through the first channel to perform a next process; if the LCD has a broken defect, it indicates that the LCD cannot be repaired and normally used, so discharging the LCD through a second channel to scrap the LCD; if the LCD has a POL defect, a line defect or a BLU defect, it indicates that the LCD can be repaired, so discharging the LCD from a third channel to rework the LCD; for example, if the LCD has a POL defect, the LCD can be repaired by reattached a polarizer.

Figure 2:
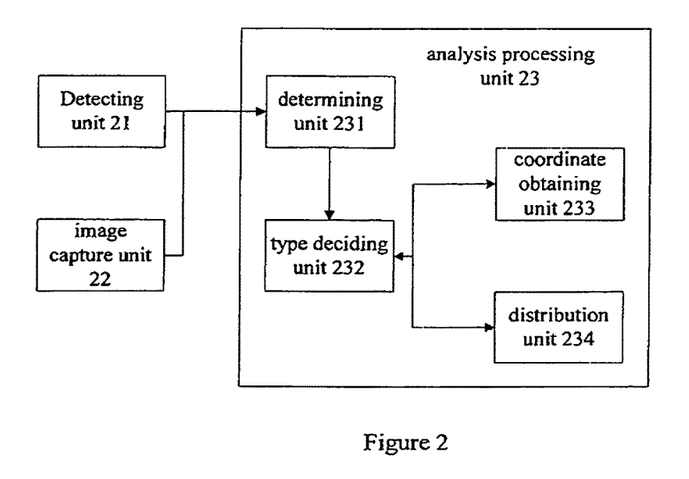
FIG. 2 shows a structural schematic view of an apparatus of inspecting the quality of the LCD provided in a first embodiment of the present invention.

FIG. 2 shows a structural schematic view of an apparatus of inspecting the quality of a LCD provided in a first embodiment of the present invention. As shown in FIG. 2, the apparatus comprises a detecting unit 21, an image capture unit 22 and an analysis processing unit 23.

The detecting unit is configured to detect the LCD to obtain optical parameters of the LCD and send the optical parameters to the analysis processing unit 23.

The image capture unit 22 is configured to capture images of the LCD and send the captured images to the analysis processing unit 23.

The analysis processing unit 23 is configured to decide that the LCD is defective if determining that the optical parameters are not in the range of the preset optical parameters and/or the captured images are not consistent with the pre-stored images.

According to an embodiment of the present invention, the analysis processing unit comprises a determining unit 231 and a type deciding unit 232.

The determining unit 231 is configured to determine whether the optical parameters are in the range of the preset optical parameters and whether the captured images are consistent with the pre-stored images; and The type deciding unit 232 is configured to decide a type of the defect based on the determining result of the determining unit 231.

According to an embodiment of the present invention, the determining unit 231 is configured to determine whether the defects are in a same plane after determining that the optical parameters are not in the range of the preset optical parameters and/or the captured images of the LCD are not consistent with the pre-stored images; and the type deciding unit 232 is configured to decide that the LCD is an inside-cell defect if the determining unit 231 determines that the defects are in the same plane.

According to an embodiment of the present invention, the determining unit 231 is further configured to determine whether the LCD is broken after judging that the defects are not in the same plane; and the type deciding unit 232 is further configured to decide that the LCD has a broken defect if the determining unit 231 determines that the LCD is broken.

According to an embodiment of the present invention, the determining unit 231 is further configured to determine a type of the defect based on images of bad quality if it determines that the LCD is not broken.

The type deciding unit 232 is further configured to decide that the defect is a polarizer (POL) defect or a line defect if the determining unit 231 determines that the defect is detected by an image of L0 grey scale; and decide that the defect is a back light unit (BLU) defect if the determining unit 231 determines that the defect is detected by an image of L255 grey scale.

According to an embodiment of the present invention, the determining unit 231 is further configured to compare the images of bad quality with pre-stored images of bad quality if the defect is detected neither by the image of L0 grey scale nor by the image of L255 grey scale.

The type deciding unit 232 is further configured to decide a name of the defect if the determining unit 231 determines that the images of bad quality are consistent with the pre-stored images of bad quality.

According to an embodiment of the present invention, the analysis processing unit 23 further comprises a coordinate obtaining unit 233 configured to record position coordinates of the defect after the type of the defect is decided.

According to an embodiment of the present invention, the analysis processing unit 23 further comprises a distribution unit 234 configured to distribute the LCDs to different channels to discharge the LCDs based on the quality and defect types of the LCDs, comprising: if the LCD does not have any defect, deciding that the LCD is an optimal level and distributing the LCD to a first channel to discharge the LCD, then performing a next process; if the LCD has an inside-cell defect, deciding that the LCD is a minimum level and distributing the LCD to the first channel to discharge the LCD, then performing a next process; if the LCD has a broken defect, distributing the LCD to a second channel to discharge and scrap the LCD; and if the LCD has a POL defect, a line defect or a BLU defect, distributing the LCD to a third channel to discharge and rework the LCD.

Figure 3:
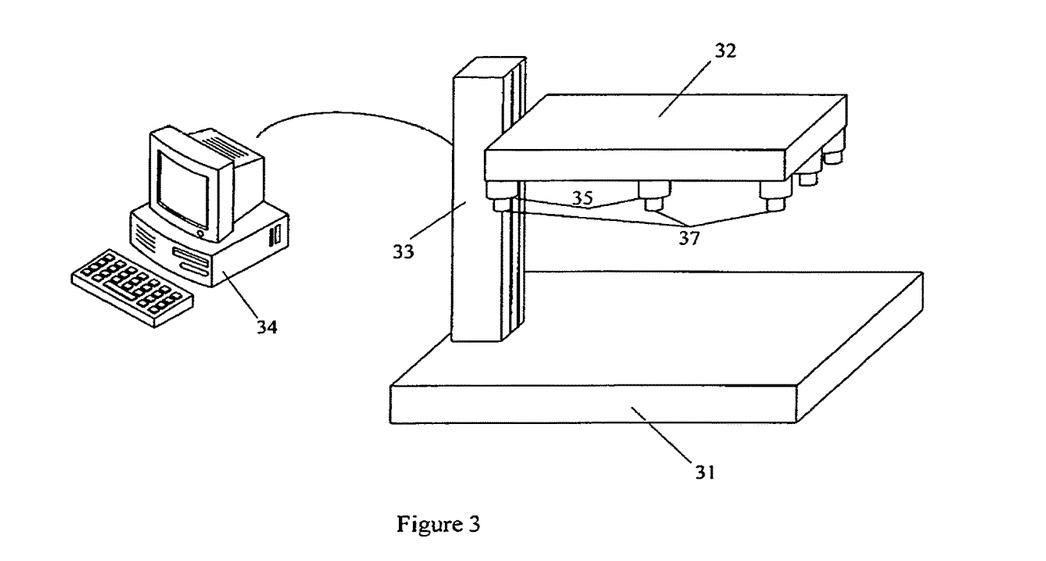
FIG. 3 shows a structural schematic view of an equipment of inspecting the quality of a LCD provided in a second embodiment of the present invention.

FIG. 3 shows a structural schematic view of an equipment of inspecting the quality of a LCD provided in a second embodiment of the present invention. As shown in FIG. 3, the equipment comprises a detecting platform 31, a lens support platform 32, a slide rail mechanism 33 connecting the detecting platform 31 with the lens support platform 32, and a host machine 34.

The detecting platform 31 is configured to place the LCD to be detected.

The lens supporting platform 32 has nine collecting points 1-9 configured to perform optical collection and image capture for the LCD accommodated on the detecting platform, wherein each of collecting points 1-9 is configured with an optical lens 37 and an optical camera 35; and the nine collecting points 1-9 are respective top points of four corners, middle points of four sides and a central point of the lens support platform 32.

The host machine 34 is electrically connected with the optical lens and the optical camera disposed on the lens support platform. And the host machine is configured to detect the LCD, obtain optical parameters of the LCD, capture images of the LCD, decide whether the LCD is defective and decide the defect type after the optical parameters are determined not in the range of the preset optical parameters and/or the captured images of the LCD are determined inconsistent with the pre-stored images, and control the operation to the LCD based on the analysis result. For example, the LCDs are distributed to respective channels to perform next operations.

Herein, since the LCDs have different thickness, the distance between the lens support platform 32 to the detecting platform 31 can be adjusted by using a slide rail mechanism in order to ensure optical lenses and optical cameras presenting an optimum focal length for the LCDs having different thickness.

Herein, the optical lens and the camera of each of the collecting points are located within a collecting apparatus (which may be bowl-like) in a same place. The optical lens is configured to scan a surface of the LCD and detect the optical parameters of the LCD, such as a chrominance value, a luminance value and a color temperature value or the like, and the data are displayed and analyzed by the host machine.

The nine optical lenses can be used to simultaneously detect the surface of the LCD in different azimuths and obtain data.

The camera takes images of surface of the LCD in stationary state and can automatically adjust focal length when taking images in order to ensure capturing images in optimum state.

According to an embodiment of the present invention, the detecting platform 31 is configured with an accommodating part for accommodating the LCD and a light source below the accommodating part, and the light source is configured to illuminate the LCD in the accommodating part.

Figure 4:
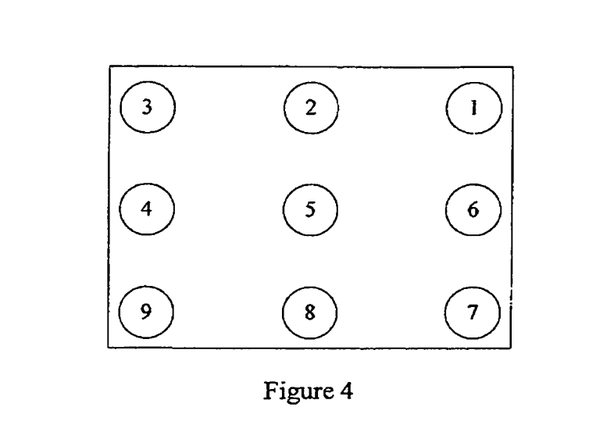
FIG. 4 shows a top view of collecting points disposed on a lens support platform provided in a second embodiment of the present invention.

FIG. 4 shows a top view of collecting points disposed on a lens support platform provided in a second embodiment of the present invention. As shown in FIG. 4, the collecting points disposed on the lens support platform are arranged in zigzag manner beginning from the top right corner (that is, from right to left in the first row, from left to right in the second row, from right to left in third row) in sequence: a first collecting point 1, a second collecting point 2, a third collecting point 3, a fourth collecting point 4, a fifth collecting point 5, a sixth collecting point 6, a seventh collecting point 7, an eighth collecting point 8 and a ninth collecting point 9.

A first optical lens at the first collecting point 1 is configured to scan LCD from 180 degrees to 270 degrees in counterclockwise in the horizontal direction and scan LCD at each angle range in vertical direction by using the first collecting point as a coordinate origin, so as to obtain optical parameters of the LCD.

A second optical lens at the second collecting point 2 is configured to scan LCD from 180 degrees to 0 degree in counterclockwise in the horizontal direction and scan LCD at each angle range in vertical direction by using the second collecting point as a coordinate origin, so as to obtain optical parameters of the LCD.

A third optical lens at the third collecting point 3 is configured to scan LCD from 270 degrees to 0 degree in counterclockwise in the horizontal direction and scan LCD at each angle range in vertical direction by using the third collecting point as a coordinate origin, so as to obtain optical parameters of the LCD.

A fourth optical lens at the fourth collecting point 4 is configured to scan LCD from 270 degrees to 90 degree in counterclockwise in the horizontal direction and scan LCD at each angle range in vertical direction by using the fourth collecting point as a coordinate origin, so as to obtain optical parameters of the LCD.

A fifth optical lens at the fifth collecting point 5 is configured to scan LCD from 0 degree to 360 degrees in counterclockwise in the horizontal direction and scan LCD at each angle range in vertical direction by using the fifth collecting point as a coordinate origin, so as to obtain optical parameters of the LCD.

A sixth optical lens at the sixth collecting point 6 is configured to scan LCD from 90 degrees to 270 degrees in counterclockwise in the horizontal direction and scan LCD at each angle range in vertical direction by using the sixth collecting point as a coordinate origin, so as to obtain optical parameters of the LCD.

A seventh optical lens at the seventh collecting point 7 is configured to scan LCD from 90 degrees to 180 degrees in counterclockwise in the horizontal direction and scan LCD at each angle range in vertical direction by using the seventh collecting point as a coordinate origin, so as to obtain optical parameters of the LCD.

An eighth optical lens at the eighth collecting point 8 is configured to scan LCD from 0 degree to 180 degrees in counterclockwise in the horizontal direction and scan LCD at each angle range in vertical direction by using the eighth collecting point as a coordinate origin, so as to obtain optical parameters of the LCD.

A ninth optical lens at the ninth collecting point 9 is configured to scan LCD from 0 degree to 90 degrees in counterclockwise in the horizontal direction and scan LCD at each angle range in vertical direction by using the ninth collecting point as a coordinate origin, so as to obtain optical parameters of the LCD.

In the coordinate system that each of the collecting points is regarded as a coordinate origin, 0 degree direction in the horizontal direction refers to the right half axis direction of X axis.

Accordingly, nine cameras corresponding to the nine collecting points are configured to capture images of corresponding regions of the LCD.

According to an embodiment of the present invention, the nine optical lenses and the nine cameras are connected to the lens support platform 32 by the slide rail mechanism.

Herein, since the LCDs have different sizes, the positions of the nine lenses and the cameras are adjustable in order to ensure that the nine lenses and the nine cameras are evenly and equidistantly distributed on nine positions of the LCD to be detected for the LCDs having different sizes. Apparently, the present invention is not limited to nine collecting points, the number of the collecting points are adjustable based on the specific shape and size of a LCD. The way of connecting the optical lenses and the cameras with the lens support platform is not limited to the slide rail connection, and any other adjustable connection manners can be used.

Figure 5:
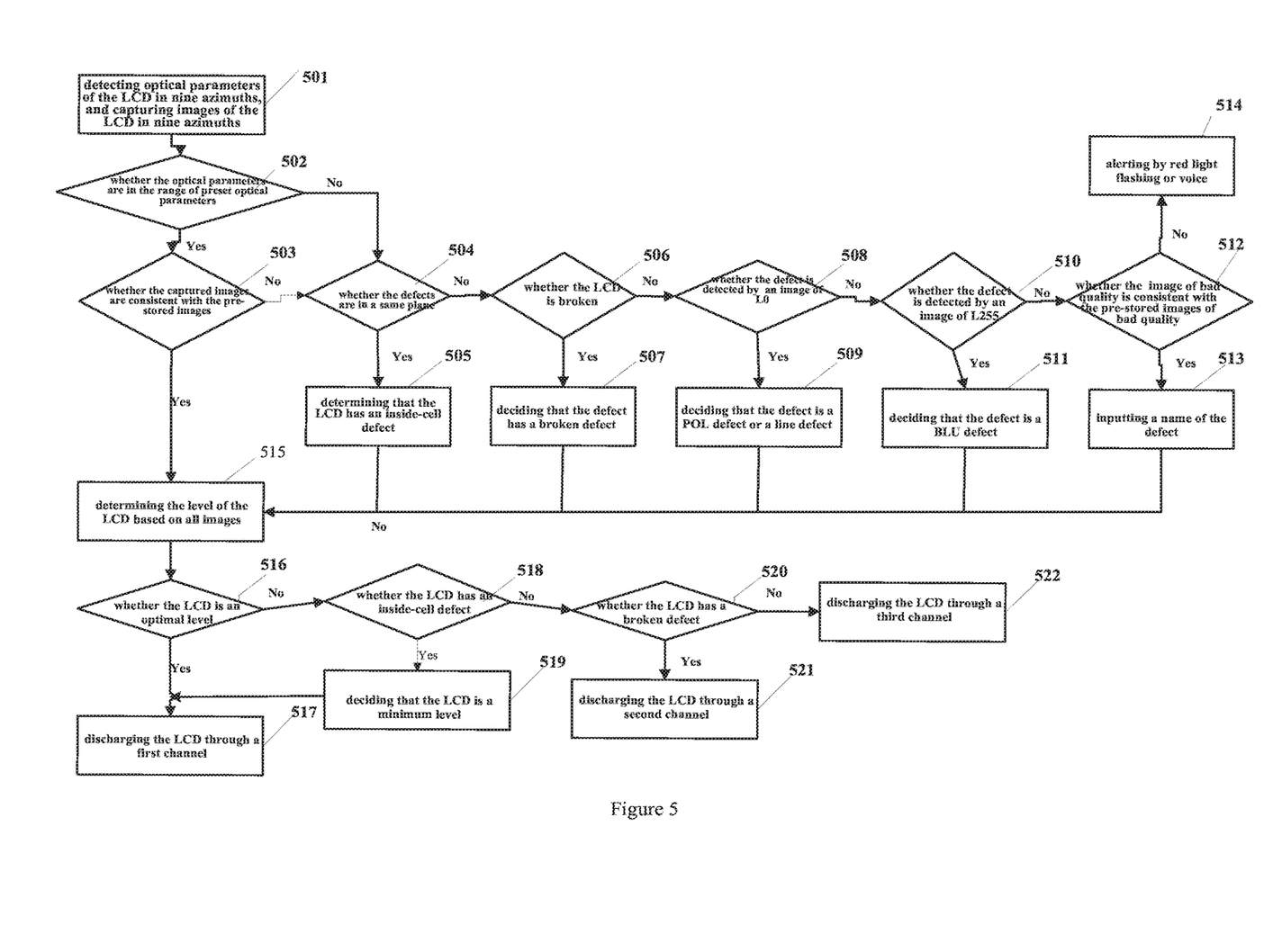
FIG. 5 shows a flowchart of a method of inspecting the quality of a LCD provided in a second embodiment of the present invention.

FIG. 5 shows a flowchart of a method of inspecting the quality of a LCD provided in a second embodiment of the present invention. As shown in FIG. 5, the method comprises the following steps.

Step 501: detecting optical parameters of the LCD in nine azimuths, and capturing images of the LCD in nine azimuths;

Herein, the evenly and equidistantly distributed optical lenses are used to detect optical parameters of the LCD in nine azimuths, wherein the optical parameters comprise a luminance value, a chrominance value and a color temperature value or the like; the evenly and equidistantly distributed cameras are used to capture images of the LCD in nine azimuths;

Step 502: determining whether the optical parameters in nine azimuths are in the range of preset optical parameters.

If the result is yes in step 502, performing step 503.
If the result is no in step 502, performing step 504.
Step 503: determining whether the captured images in nine azimuths are consistent with the pre-stored images.
If the result is yes in step 503, performing step 515.
If the result is no in step 503, performing step 504.
Step 504: determining whether the defects are in a same plane.
If the result is yes in step 504, performing step 505.
Step 505: deciding that the LCD is an inside-cell defect, and continuing to perform step 515.
If the result is no in step 504, performing step 506.
Step 506: determining whether the LCD is broken;
If the result is yes in step 506, performing step 507.
Step 507: deciding that the LCD has a broken defect, and continuing to perform step 515.
If the result is no in step 506, performing step 508.
Step 508: determining whether the defect is detected by an image of L0 grey scale.
If the result is yes in step 508, performing step 509.

Step 509: deciding that the defect is a polarizer (POL) defect or a line defect, and continuing to perform step 515.

If the result is no in step 508, continuing to perform step 510.

Step 510: determining whether the defect is detected by an image of L255 grey scale.

If the result is yes in step 510, performing step 511.

Step 511: deciding that the defect is a back light unit (BLU) defect, and continuing to perform step 515.

If the result is no in step 510, continuing to perform step 512.

Step 512: determining whether the image of bad quality is consistent with the pre-stored images of bad quality.

If the result is yes in step 512, performing step 513.

Step 513: inputting a name of the defect, and continuing to perform step 515;

If the result is no in step 512, performing step 514.

Step 514: alerting by red light flashing or voice.

Herein, if the defect is detected neither by the image of L0 grey scale nor by the image of L255 grey scale, comparing the image of bad quality with the pre-stored images of bad quality. If the image of bad quality is consistent with the pre-stored images of bad quality by the comparing, recording the type of the image of bad quality. If the image of bad quality is not consistent with the pre-stored images of bad quality, warning a technician by an alert so that the technician further decides a type of the defect manually.

Step 515: deciding the level of the LCD based on all images, then performing step 516.

Step 516: further determining whether the LCD is an optimal level.

If the result is yes in step 516, performing step 517.

Step 517: discharging the LCD through a first channel.

If the result is no in step 516, continuing to perform step 518.

Herein, if the LCD does not have any defect, deciding that the LCD is an optimal level, and discharging the LCD through the first channel to perform a next process.

Step 518: determining whether the LCD is an inside-cell defect.

If the result is yes in step 518, performing step 519.

Step 519: deciding that the LCD is a minimum level, back to perform step 517; and discharging the LCD through the first channel to perform a next process.

If the result is no in step 518, continuing to perform step 520.

Herein, if the LCD has an inside-cell defect, it indicates that the LCD cannot be repaired but can still be used, then deciding that the LCD is a minimum level and discharging the LCD through the first channel to perform a next process.

Step 520: determining whether the LCD has a broken defect.

If the result is yes in step 520, performing step 521.

Step 521: discharging the LCD through a second channel.

If the result is no in step 520, performing step 522.

Step 522: discharging the LCD through a third channel.

Herein, if the LCD has a broken defect, it indicates that the LCD cannot be repaired and cannot be normally used, then discharging the LCD through a second channel to scrap the LCD. If the LCD has a POL defect, a line defect or a BLU defect, it indicates that the LCD can be repaired, then discharging the LCD through a third channel to rework the LCD.

The embodiments of the present invention provide a method, an apparatus and an equipment of inspecting the quality of a LCD, comprise: obtaining optical parameters of the LCD; capturing images of the LCD; and deciding that the LCD is defective after determining that the optical parameters are not in the range of the preset optical parameters and/or the captured images of the LCD are not consistent with the pre-stored images. In such ways, it can effectively differentiate the defect types of a product and record the defect position of the product, thereby it can effectively reduce misjudgment or miss test caused by the visual differences between operators so as to improve the quality and yield of manufactured LCD.

The described above are only illustrative embodiments for describing the present invention, and are not to limit the present invention. For an ordinary skill in the art, various modifications and variations can be made without departing from the spirit and scope of the present invention, and all of which and their equivalents should fall within the scope of the present invention.

What is claimed is:

1. A method of inspecting the quality of a liquid crystal display (LCD), comprising:
    obtaining optical parameters of the LCD;
    capturing images of the LCD; and
    if determining that the optical parameters are not in a range of the preset optical parameters, or if determining that the optical parameters are in a range of the preset optical parameters and the captured images of the LCD are not consistent with pre-stored images, deciding that the LCD is defective, wherein the deciding that the LCD is defective comprises:
    determining whether defects are in a same plane; if the defects are in the same plane, deciding that the LCD has an inside-cell defect.

2. The method according to claim 1, further comprising:
    if the defects are not in the same plane, determining whether the LCD is broken; if the LCD is broken, deciding that the LCD has a broken defect.

3. The method according to claim 2, further comprising:
    if the LCD is not broken, deciding a type of the defect based on images of bad quality, wherein the step of deciding a type of the defect based on the images of bad quality comprises:
    if the defect is detected by an image of L0 grey scale, deciding that the defect is a polarizer (POL) defect or a line defect; and
    if the defect is detected by an image of L255 grey scale, deciding that the defect is a back light unit (BLU) defect.

4. The method according to claim 3, further comprising:
    if the LCD has an inside-cell defect, deciding that the LCD is a minimum level and discharging the LCD through a first channel;
    if the LCD has a broken defect, discharging the LCD through a second channel to scrap the LCD; and
    if the LCD has a POL defect, a line defect or a BLU defect, discharging the LCD through a third channel to rework the LCD.

5. A method of inspecting the quality of a liquid crystal display (LCD), comprising:
    obtaining optical parameters of the LCD;
    capturing images of the LCD; and
    if determining that the optical parameters are not in a range of the preset optical parameters, or if determining that the optical parameters are in a range of the preset optical parameters and the captured images of the LCD are not consistent with pre-stored images, deciding that the LCD is defective; and further comprising:

if a defect is detected by an image of L0 grey scale, deciding that the defect is a polarizer (POL) defect or a line defect;

if a defect is detected by an image of L255 grey scale, deciding that the defect is a back light unit (BLU) defect;

if the defect is detected neither by the image of L0 grey scale nor by the image of L255 grey scale, comparing the image of bad quality with pre-stored images of bad quality; if the image of bad quality is consistent with the pre-stored images of bad quality by the comparing, deciding a name of the defect.

6. The method according to claim 5, further comprising:
recording position coordinates of the defect after deciding the type of the defect.

7. The method according to claim 5, further comprising:
if the LCD does not have any defect, deciding that the LCD is an optimal level and discharging the LCD through a first channel.

8. An apparatus of inspecting the quality of a liquid crystal display (LCD), comprising: a detecting unit, an image capture unit and an analysis processing unit; wherein the detecting unit is configured to detect the LCD to obtain optical parameters of the LCD and send the optical parameters to the analysis processing unit;

the image capture unit is configured to capture images of the LCD and send the captured images to the analysis processing unit; and the analysis processing unit is configured to decide that the LCD is defective if determining that the optical parameters are not in the range of the preset optical parameters, or if determining that the optical parameters are in a range of the preset optical parameters and the captured images are not consistent with the pre-stored images; wherein the analysis processing unit comprises a determining unit and a type deciding unit; wherein the determining unit is configured to determine whether the optical parameters are in a range of the preset optical parameters and whether the captured images of the LCD are consistent with pre-stored images; and the type deciding unit is configured to decide a type of the defect based on the determining result of the determining unit; wherein the type deciding unit is configured to decide the type of the defect based on images of bad quality if the LCD is not broken, and to decide that the defect is a polarizer (POL) defect or a line defect if the determining unit determines that the defect is detected by an image of L0 grey scale; and to decide that the defect is a back light unit (BLU) defect if the determining unit determines that the defect is detected by an image of L255 grey scale.

9. The apparatus according to claim 8, wherein the determining unit is configured to determine whether the defects are in a same plane; and the type deciding unit is configured to decide that the LCD has an inside-cell defect if the defects are in the same plane.

10. The apparatus according to claim 9, wherein
the determining unit is also configured to decide whether the LCD is broken after determining that the defects are not in a same plane; and the type deciding unit is configured to decide that the LCD has a broken defect if the determining unit determine that LCD is broken.

11. The apparatus according to claim 8, wherein
the determining unit is configured to compare the images of bad quality with pre-stored images of bad quality if the determining unit determines that the defect is detected neither by the image of L0 grey scale nor by the image of L255 grey scale; and the type deciding unit is configured to decide a name of the defect if the determining unit determines that the images of bad quality are consistent with the pre-stored images of bad quality.

12. The apparatus according to claim 11, wherein the analysis processing unit further comprises a coordinate obtaining unit configured to record position coordinates of the defect after deciding the type of the defect.

13. The apparatus according to claim 12, wherein the analysis processing unit further comprises a distributing unit configured to distribute the LCDs to different channels to discharge the LCDs based on the quality and defect types of the LCDs, wherein if the LCD does not have any defect, and the LCD is decided as an optimal level, the distributing unit distributes the LCD to a first channel to discharge the LCD;

if the LCD has an inside-cell defect, and the LCD is decided as a minimum level, the distributing unit distributes the LCD to the first channel to discharge the LCD;

if the LCD has a broken defect, the distributing unit distributes the LCD to a second channel to discharge and scrap the LCD; and if the LCD has a POL defect, a line defect or a BLU defect, the distributing unit distributes the LCD to a third channel to discharge and rework the LCD.

* * * * *